June 1, 1965

D. E. WILHELM ET AL 3,186,726

BLADE CLAMP FOR JIG SAW

Filed Sept. 21, 1962

INVENTORS
DAVID E. WILHELM
VINCENT J. RAUM

BY *Leonard Bloom*

ATTORNEY

June 1, 1965  D. E. WILHELM ETAL  3,186,726
BLADE CLAMP FOR JIG SAW
Filed Sept. 21, 1962  2 Sheets-Sheet 2
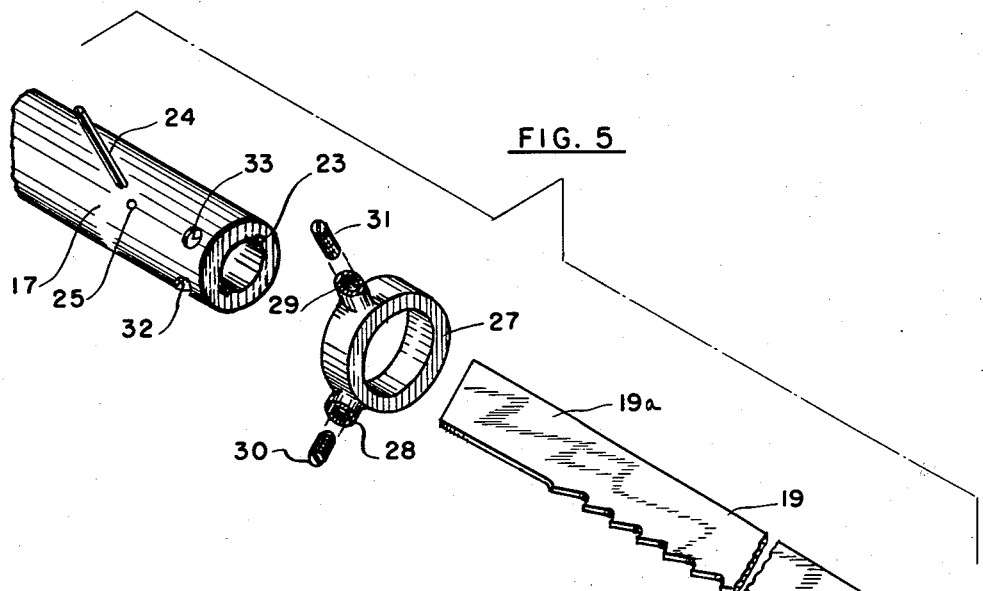
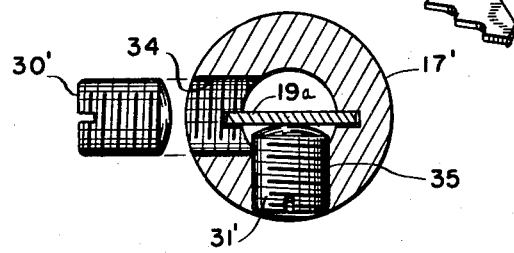
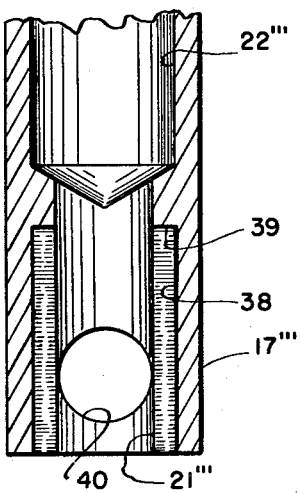
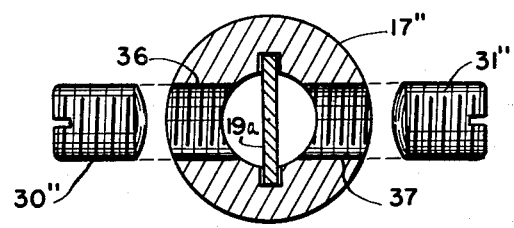
INVENTORS
DAVID E. WILHELM
VINCENT J. RAUM
BY *Leonard Bloom*
ATTORNEY 3,186,726
BLADE CLAMP FOR JIG SAW
David E. Wilhelm, Hampstead, and Vincent J. Raum, Baltimore, Md., assignors to The Black and Decker Manufacturing Company, Towson, Md., a corporation of Maryland
Filed Sept. 21, 1962, Ser. No. 225,181
1 Claim. (Cl. 279—83)

The present invention relates to a blade clamp for a portable electric jig saw, and more particularly, to a blade clamp which may be manufactured easily and economically, yet will be durable and reliable for extended periods of usage.

It is an object of the present invention to provide, for use in a portable electric jig saw having a reciprocating shaft to which a blade is to be secured, a blade clamp comprising in combination, an axial bore formed at the end of the shaft, a longitudinal slot formed diametrically across the bore to receive the shank of the saw blade therein, the longitudinal slot extending radially of the bore and terminating short of the outer surface of the shaft, an internal stop provided within the shaft at the end of the slot, thereby limiting the inward movement of the blade longitudinally of the shaft, and means to clamp the blade to the shaft in a plane which is substantially perpendicular to the shaft.

It is another object of the present invention to provide, for use in a portable electric jig saw having a reciprocating shaft, a blade clamp comprising a roll pin or equivalent member passing tranversely of the reciprocating shaft so as to limit the inward movement of the saw blade shank with respect to the shaft, in combination with means to clamp the saw blade shank to the shaft along two mutually-perpendicular directions and within a plane which is substantially perpendicular to the reciprocating shaft itself.

In accordance with the teachings of the present invention, one particular embodiment thereof is herein illustrated, wherein a blade clamp is provided which is suitable for use with a portable power-driven tool such as a portable electric jig saw. The jig saw is provided with a reciprocating shaft to which the shank of a saw blade is to be secured. A blind axial bore is formed at one end of the reciprocating shaft, and a longitudinal slot is formed in the shaft diametrically across the bore, so that the shank of the saw blade may be received in the slot. Preferably, a pin passes through the reciprocating shaft and is secured to the shaft transversely of the slot. The pin is anteriorly of the bore and at one end of the longitudinal slot, such that the pin limits the inward movement of the saw blade longitudinally of the shaft. Means are then provided to clamp the shank of the saw blade to the shaft in a plane which is substantially perpendicular to the reciprocating shaft.

These and other objects of the present invention will become apparent from a reading of the following specification, taken in conjunction with the enclosed drawings, in which:

FIGURE 5 is an exploded perspective view showing the lower part of the reciprocating shaft, the transverse roll pin, the saw blade, the clamping collar, and the pair of set screws;

FIGURE 6 is a section view corresponding to that of FIGURE 4, but showing a first modification wherein the clamping collar has been eliminated, and wherein the reciprocating shaft has a slightly larger diameter so that the tapped recesses may be formed directly in the shaft itself;

Figure 2:
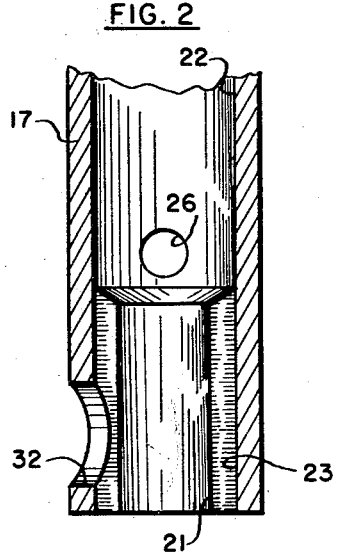
FIGURE 2 is a longitudinal section of the reciprocating shaft itself.

FIGURE 7 is a second modification, similar to that of FIGURE 6, but showing how the set screws are axially aligned, one with another, so as to engage with the respective sides of the saw blade shank; and FIGURE 8 is a third modification, similar to that of FIGURE 2, but showing how the longitudinal slot (that is formed diametrically across the first axial bore) may be terminated short of the second axial bore so as to form an internal stop for the shank of the saw blade, thus eliminating the requirement for a roll pin or its equivalent.

Figure 1:
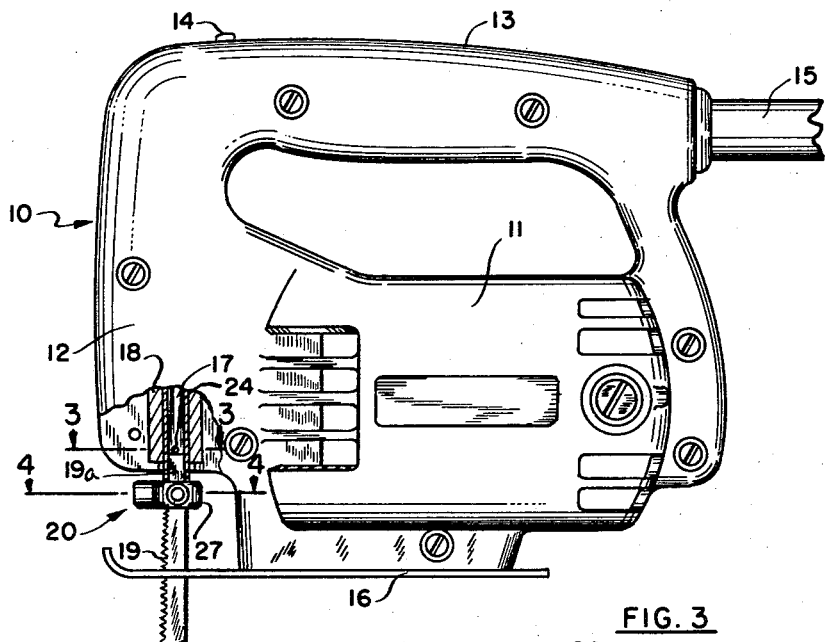
FIGURE 1 is an elevational view of a portable electric jig saw with the lower case being broken away to show the reciprocating shaft, the bearing to support the shaft, and the blade clamping means of the present invention.

With reference to FIGURE 1, there is illustrated for convenience a portable electric jig saw 10, although it will be appreciated that the teachings of the present invention are equally applicable to a variety of reciprocating tools, appliances and devices. With this in mind, the jig saw 10 comprises a motor housing 11, a gear case 12 forwardly of the motor housing 11, an overhead handle 13, a switch 14 and a conventional line cord 15 carried by the handle 13, a shoe 16 by means of which the saw 10 may be guided along the top surface of a suitable workpiece, a reciprocating shaft 17 journaled within the gear case 12 by means of a suitable bearing 18, and a saw blade 19 having a shank portion 19a which is secured to the reciprocating shaft 17 by clamping means, the latter being denoted generally as at 20.

With reference to FIGURES 2 and 5, the reciprocating shaft 17 has a first axial bore 21 formed therein at one end thereof, and the shaft 17 further has a second axial bore 22 formed at its opposite end. The bores 21 and 22 communicate with each other, and the second axial bore 22 (see FIGURE 2) is of a slightly larger diameter than the first axial bore 21. A longitudinal slot 23 is then formed, in the one end of the shaft 17, diametrically across the first bore 21. Preferably, the slot 23 is formed by a broaching operation in which the chips may be disposed of through the second (and larger) axial bore 22. The slot 23 extends radially of the first bore 21 but terminates short of the outer surface of the shaft 17.

Figure 3:
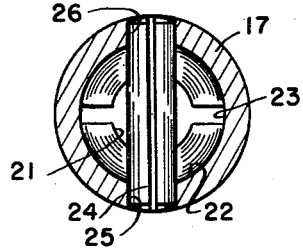
FIGURE 3 is a sectional view taken along the lines 3—3 of FIGURE 1 showing the transverse roll pin which is secured to the reciprocating shaft to limit the inward movement of the saw blade shank longitudinally of the shaft.

With reference to FIGURES 2, 3, and 5, a pin or equivalent member (such as a roll pin 24) is received within a pair of holes 25 and 26, which are aligned with each other, and which are formed in the reciprocating shaft 17 anteriorly of the first axial bore 21. The roll pin 24 is transverse to the longitudinal slot 23, and as shown more particularly in FIGURE 1, the roll pin 24 limits the inward movement of the saw blade shank 19a longitudinally with respect to the reciprocating shaft 17.

Figure 4:
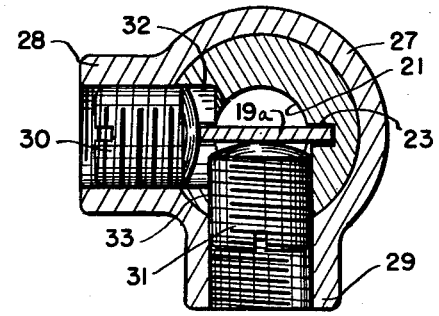
FIGURE 4 is a sectional view taken along the line 4—4 of FIGURE 1 and showing the mutually-perpendicular clamping screws.

With reference to FIGURES 4 and 5, a clamping collar 27 is slidably received upon the lower external end of the reciprocating shaft 17. The clamping collar 27 has a pair of integrally-formed tapped bosses 28 and 29, respectively, which are mutually-perpendicular to each other. Respective set screws 30 and 31 are received within the threaded bosses 28 and 29. A first hole 32 and a second hole 33 are then formed in the lower end of the reciprocating shaft 17, so as to accommodate the set screws 30 and 31, respectively. Thus, it will be appreciated that the set screws 30 and 31 of the clamping collar 27 engage, respectively, a side and an edge of the saw blade shank 19a, thus clamping the saw blade 19 to the reciprocating shaft 17. This clamping action is in a plane which is substantially perpendicular to the reciprocating shaft 17, and within that plane, the set screws 30 and 31 are at right angles to each other.

With reference to FIGURE 6, a first modification is illustrated wherein the lower protruding portion of the shaft 17' has an enlarged diameter so that a pair of tapped holes 34 and 35 may be formed therein directly; these tapped holes 34 and 35 accommodate respective set screws 30' and 31', thus eliminating the clamping collar 27.

With reference to FIGURE 7, a second modification is illustrated wherein the lower protruding portion of the reciprocating shaft 17" has a pair of tapped holes 36 and 37 which receive respective set screws 30" and 31". The tapped holes 36 and 37 are aligned with each other, and thus the screws 30" and 31" clamp against the sides of the saw blade shank 19a, rather than a respective edge and a respective side of the shank (as in FIGURE 6).

With reference to FIGURE 8, a third modification is illustrated wherein a longitudinal slot 38 is formed diametrically across the first axial bore 21''' of the shaft 17''' and terminates short of the second axial bore 22''' to form an internal stop means, represented by the shoulder 39; this shoulder 39 limits the inward movement of the saw blade shank 19a longitudinally with respect to the shaft 17''', thus eliminating the requirement for a roll pin or its equivalent. The slot 38 may be formed by a "plunge" broaching operation, as understood by those skilled in the art, while the slot 23 in the shaft 17 (see FIGURE 2) may be formed by a "pull" broaching operation. Suitable holes, one of which is shown as at 40, may also be formed in the shaft 17''' to clamp the saw blade shank 19a to the shaft 17''' in a suitable manner.

Obviously, many minor modifications may be made without departing from the basic spirit of the present invention; and accordingly, within the scope of the appended claim, the invention may be practiced other than has been specifically described.

We claim:

In a jig saw having a reciprocating shaft to which the shank of a saw blade is to be secured, a blade clamp comprising:

(a) a first axial bore formed at one end of the shaft;

(b) a second axial bore formed at the opposite end of the shaft;

(c) said bores communicating with each other, and said second bore having a slightly larger diameter than said first bore;

(d) a longitudinal slot formed diametrically across said first bore, said slot communicating with said second bore, whereby the shank of the saw blade may be received in said slot;

(e) a pair of holes formed in the shaft on a transverse axis;

(f) said holes being substantially alined with one another, and said holes communicating with said second bore and being spaced inwardly from said longitudinal slot;

(g) a longitudinally-slotted resilient roll pin frictionally seated within said holes and accommodating any misalinements, and said roll pin limiting the inward movement of the saw blade longitudinally of the shaft; and (h) means to clamp the shank of the saw blade to the reciprocating shaft.

References Cited by the Examiner

UNITED STATES PATENTS

| | | |
|---|---|---|
| 2,621,685 | 12/52 | Butz. |
| 2,704,041 | 3/55 | Holford. |
| 2,902,067 | 9/59 | Oakley. |
| 2,906,304 | 9/59 | Levine. |
| 2,970,484 | 2/61 | Springer. |

WILLIAM W. DYER, JR., *Primary Examiner.*

DONALD R. SCHRAN, *Examiner.*